United States Patent [19]
Kishi et al.

[11] Patent Number: 5,681,218
[45] Date of Patent: Oct. 28, 1997

[54] AIR CONDITIONING SYSTEM FOR VEHICLES

[75] Inventors: Noriaki Kishi, Chiryu; Yoshinobu Suzuki, Kasugai, both of Japan

[73] Assignee: Nippondenso Co., Ltd., Kariya, Japan

[21] Appl. No.: 683,990

[22] Filed: Jul. 19, 1996

[30] Foreign Application Priority Data

Jul. 21, 1995 [JP] Japan .................................. 7-186071

[51] Int. Cl.$^6$ .................................................. B60H 3/06
[52] U.S. Cl. ...................... 454/75; 55/312; 454/139; 454/158
[58] Field of Search ........................... 454/75, 139, 144, 454/158; 55/274, 312, 467

[56] References Cited

U.S. PATENT DOCUMENTS

| 4,610,703 | 9/1986 | Kowalczyk | 454/158 X |
| 5,486,138 | 1/1996 | Sorensen | 454/158 X |

FOREIGN PATENT DOCUMENTS

| 24 16 805 | 10/1975 | Germany | 454/158 |
| 59-32516 | 2/1984 | Japan | 454/158 |
| 62-122820 | 6/1987 | Japan . | |
| 6-315650 | 11/1994 | Japan . | |
| 2 131 541 | 6/1984 | United Kingdom | 454/158 |

*Primary Examiner*—Harold Joyce
*Attorney, Agent, or Firm*—Cushman, Darby & Cushman IP Group of Pillsbury Madison & Sutro LLP

[57] ABSTRACT

An air conditioning system for vehicles prevents pressure loss in an air conditioner casing from increasing by air-conditioning a passenger compartment while detouring around an air cleaning unit when the air conditioning situation is in an irregular air conditioning range, and improves passengers' comfort by cleaning and air-conditioning air by way of the air cleaning unit when the air conditioning situation is in a regular air conditioning range. An air conditioner controller controls inlet switching dampers for switching air flowing routes in the air conditioner casing, thereby selecting an external or an internal air conditioning priority mode in which air directed to the passenger compartment passes through the air conditioning unit but makes a detour around the air cleaning unit when the air conditioning situation is in the irregular air conditioning range, and for selecting an external or an internal air cleaning mode in which air directed to the passenger compartment passes through the air conditioning unit as well as the air cleaning unit when the air conditioning situation is in the regular air conditioning range.

15 Claims, 9 Drawing Sheets

AIR CONDITIONING SYSTEM FOR VEHICLES

BACKGROUND OF THE INVENTION

1. Field of the Invention

This invention relates to an air conditioning system having in, e.g., an air conditioner casing for a vehicle air conditioner, an air cleaning apparatus such as a dust removal filter for removing dust from air or a deodorant catalyst for deodorizing air.

2. Description of Related Art

In a conventional air conditioning system for vehicles, a cleaning filter is mounted on an upstream side of an evaporator in an air flowing route within an air conditioner casing thereof, to prevent bad odors and to remove dust of air blown from the air conditioner casing into a passenger compartment. Such an air conditioning system has been disclosed in, e.g., Japanese Unexamined Patent Publication No. Sho 62-122820.

With such a conventional air conditioning system for vehicles, the cleaning filter installed in the air flowing route within the air conditioner casing may impair air communication thereof and aggravate pressure loss of the air flowing route a great deal when the air conditioning is in an irregular zone, or when the temperature is adjusted by high speed operation of a centrifugal fan to make the room temperature close to a preset temperature set by the passenger where the room temperature is higher than the preset temperature. The air amount blown from the air conditioner casing into the passenger compartment is therefore reduced, and this reduced air amount raises problems such as that the temperature control needs a longer time to be completed.

Meanwhile, passengers generally expect quickness of temperature reduction, or temperature control, rather than cleaning of bad-smelling air generated by the air conditioner, in the case that the passengers get into a vehicle whose interior temperature is extremely high after, e.g., parking on a sizzling summer day. In contrast, when the car interior temperature is maintained at a preset temperature, passengers expect cleaning of bad-smelling air generated by the air conditioner. In sum, passengers' requests vary between when the air conditioning situation in the passenger compartment is in the irregular zone and when it is in a regular zone.

SUMMARY OF THE INVENTION

In view of the above problems of the prior art, it is an object of the present invention to provide an air conditioning system in which pressure loss in an air flowing route is not aggravated even when the air conditioning situation in a passenger compartment is in an irregular zone.

According to the invention, when the air conditioning situation in the passenger compartment is in an irregular zone, a route switching unit operates automatically or manually to switch the air flowing route from a first air flowing route to a second air flowing route. Air purged by a fan through an air conditioner casing into the passenger compartment thereby detours around a cleaning unit and is blown into the passenger compartment after being air-conditioned by the air conditioning. Accordingly, when the air conditioning situation in the passenger compartment is in the irregular zone, the pressure loss within the air conditioner casing is made smaller, thereby preventing the air amount from being decreased, so that the time required for the air conditioning situation in the passenger compartment to reach the regular zone will be shortened.

In a preferred embodiment of the invention, when the air conditioning situation in the passenger compartment reaches the regular zone, the route switching unit is operated manually or automatically to switch the air flowing route from the second flowing route to the first flowing route. Air purged by the fan through the air conditioner casing into the passenger compartment thereby passes through both of the cleaner and the air conditioner, so that the air cleaned by the cleaner is air-conditioned by the air conditioner and blown into the passenger compartment. Accordingly, when the air conditioning situation in the passenger compartment is in the regular zone, the system conducts not only air conditioning of the passenger compartment but also cleaning of air.

An air inlet can be provided around the cleaner arranged at the center of the passenger compartment to enable the cleaner to clean uncleaned air in the passenger compartment upon intake of the air at the center of the passenger compartment into the air conditioner casing. A pivoting door may open an exhaust outlet and discard dust and bad-smelling air removed by the cleaner outside the passenger compartment through the exhaust outlet. The passenger compartment therefore does not receive such dust and bad-smelling air removed by the cleaner. The air conditioning system may include a regenerator for regenerating the cleaner. When the cleaner is a dust removal filter for removing dust from air flowing through the air conditioner casing, the dust removal filter is regenerated by vibrating the dust removal filter. When the cleaner is a deodorant catalyst for deodorizing the air flowing through the air conditioner casing, the deodorant catalyst is regenerated by heating the deodorant catalyst. After the cleaner is regenerated, the system discards the dust or bad-smelling air removed from the cleaner outside the passenger compartment to keep the passenger compartment clean.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
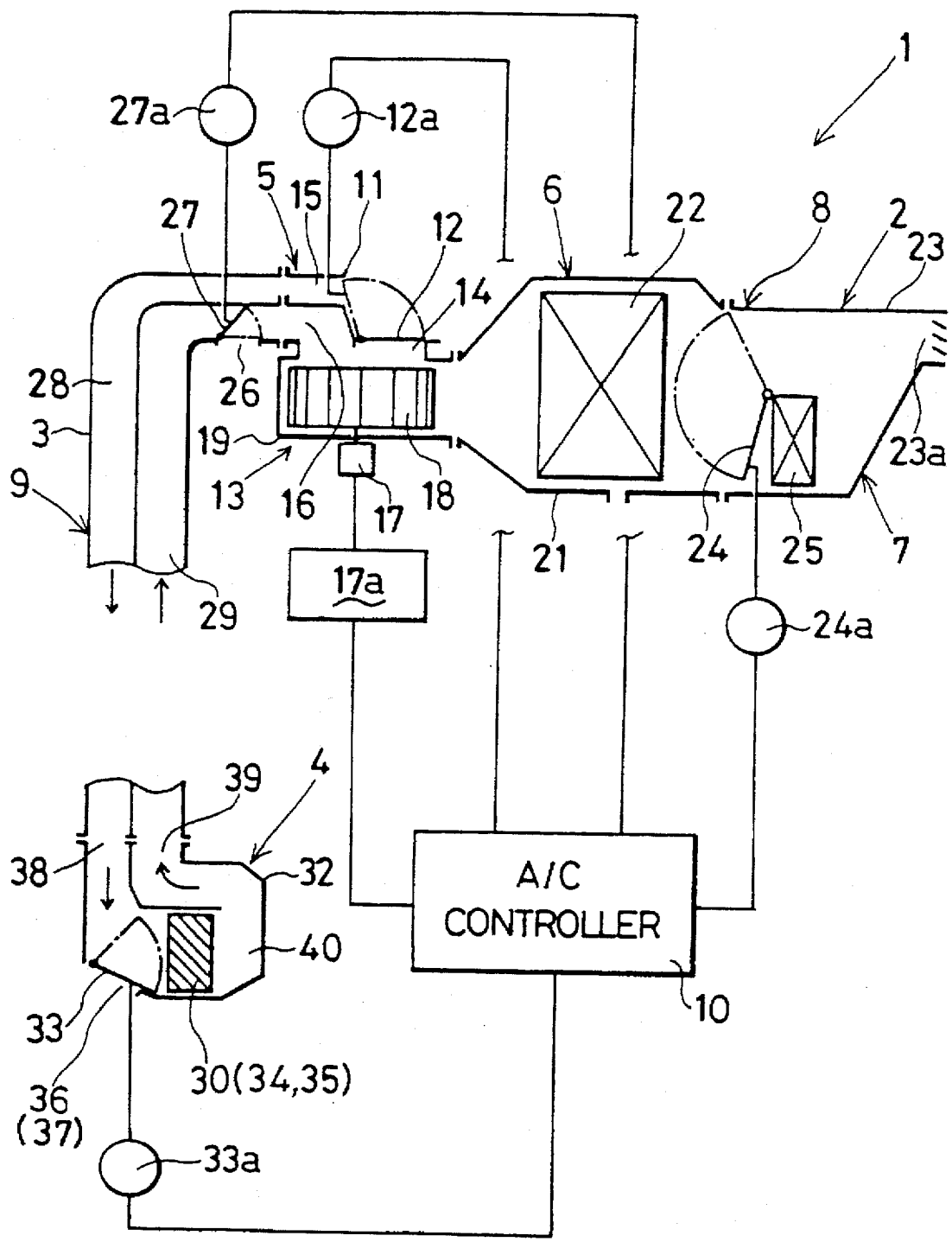
FIG. 1 shows an air conditioning unit, a duct, and an air cleaning apparatus for an automatic air conditioner for an automobile according to a first preferred embodiment of the invention.
Figure 2:
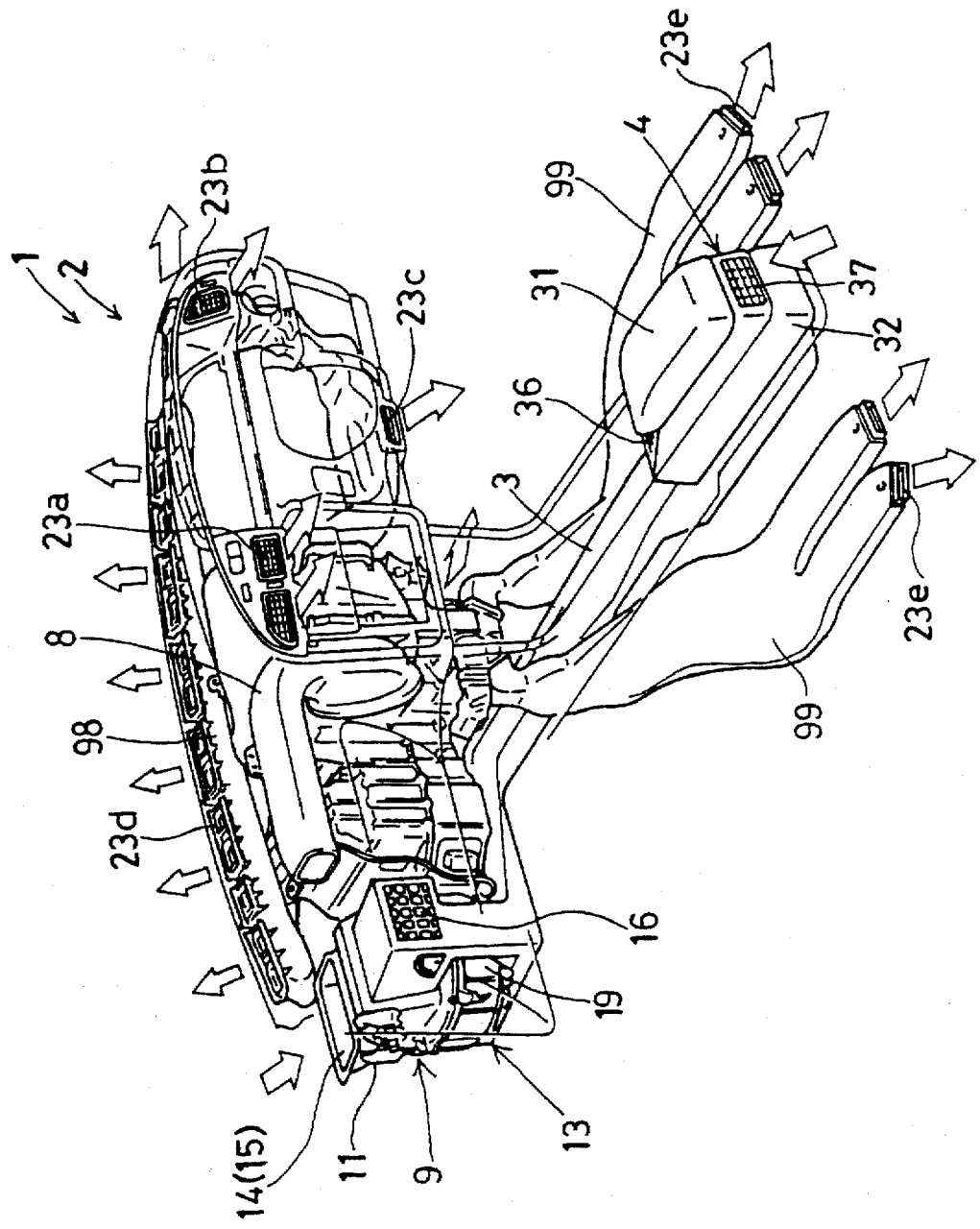
FIG. 2 is a perspective view showing the air conditioner of the first embodiment.

An air conditioner for an automobile according to a first preferred embodiment of the present invention is shown in FIGS. 1 and 2. The air conditioner 1 in this embodiment includes an air conditioning unit 2 mounted on a front side in a passenger compartment of the automobile, a duct 3 connected to the air conditioning unit 2, an air cleaning apparatus 4 connected to the air conditioning unit 2 through the duct 3 and placed at the center of the passenger compartment of the automobile, and an air conditioner controller 10 for controlling various devices in the air conditioner 1.

FIGS. 1 and 2 show the air conditioning unit 2 of this embodiment. The air conditioning unit 2 has an intake unit 5 for drawing in air inside or outside the passenger compartment into the inside of the unit to direct the air from the upstream to the downstream of the air conditioning unit 2, a cooler unit 6 for cooling air passing therethrough, and a heater unit 7 controlling the temperature of air passing therethrough and switching air blowing directions in the passenger compartment.

In FIGS. 1 and 2, the intake unit 5 has, in a unit casing 11, an inlet switching damper 12 and a centrifugal fan unit 13. The unit casing 11 is formed with external air inlets 14, 15 for drawing in external air and a cleaned air introduction opening 16 for introducing cleaned air. The inlet switching damper 12 corresponds to the route switching means recited in the appended claims and is driven by an actuator 12a, such as a servo motor, to selectively open and close the external air inlets 14, 15. The centrifugal fan unit 13 corresponds to the fan means recited in the appended claims and includes a blower motor 17, a centrifugal fan 18 rotatably driven by the blower motor 17, a scroll casing 19 integrally formed with the unit casing 11, etc. A blower drive circuit 17a controls the voltage applied to the blower motor 17.

The cooler unit 6 has an evaporator 22 in a unit casing 21 as shown in FIGS. 1 and 2. The evaporator 22 corresponds to the air conditioning means recited in the appended claims and includes a refrigeration cycle in cooperation with a compressor, a condenser, a receiver, and an expansion valve (all not shown), and is a cooling medium evaporator for cooling air passing therethrough.

The heater unit 7 in this embodiment includes, within a unit casing 23, an air mix damper 24, a heater core 25, and an outlet switching damper (not shown). The unit casing 23 is formed with center face outlets 23a, side face outlets 23b, front seat foot outlets 23c, defroster outlets 23d, and rear seat foot outlets 23e. In FIG. 2, reference numeral 98 indicates a defroster nozzle and reference numeral 99 indicates rear side ducts. In this embodiment, an air conditioning duct 8 includes the unit casing of the intake unit 5, the scroll casing 19, the unit casing of the cooler unit 6, and the unit casing 23 of the heater unit 7.

The air mix damper 24 is driven by an actuator 24a such as a servo motor. The air mix damper 24 corresponds to the blowing temperature control means as recited in the appended claims and controls an air amount passing through the heater core 25 and an air amount detouring around the heater core 25 in accordance with its opening degree. The heater core 25 heats air passing therethrough in accordance with the temperature of coolant fed from an engine cooling system for the automobile. The outlet switching damper can switch the blowing mode by selectively opening or shutting the respective outlets 23a to 23e, among a face mode in which mainly cooled air is blown toward the heads of passengers to cool the passenger compartment, a bi-level mode for comfortably heating the passenger compartment in a manner cooling the heads and heating the feet of the passengers, a foot mode in which mainly warm air is blown toward the feet of the passengers to heat the passenger compartment, a foot defroster mode for heating the passenger compartment as well as for removing frost on a windshield, and a defroster mode for removing frost on the windshield.

Figure 3:
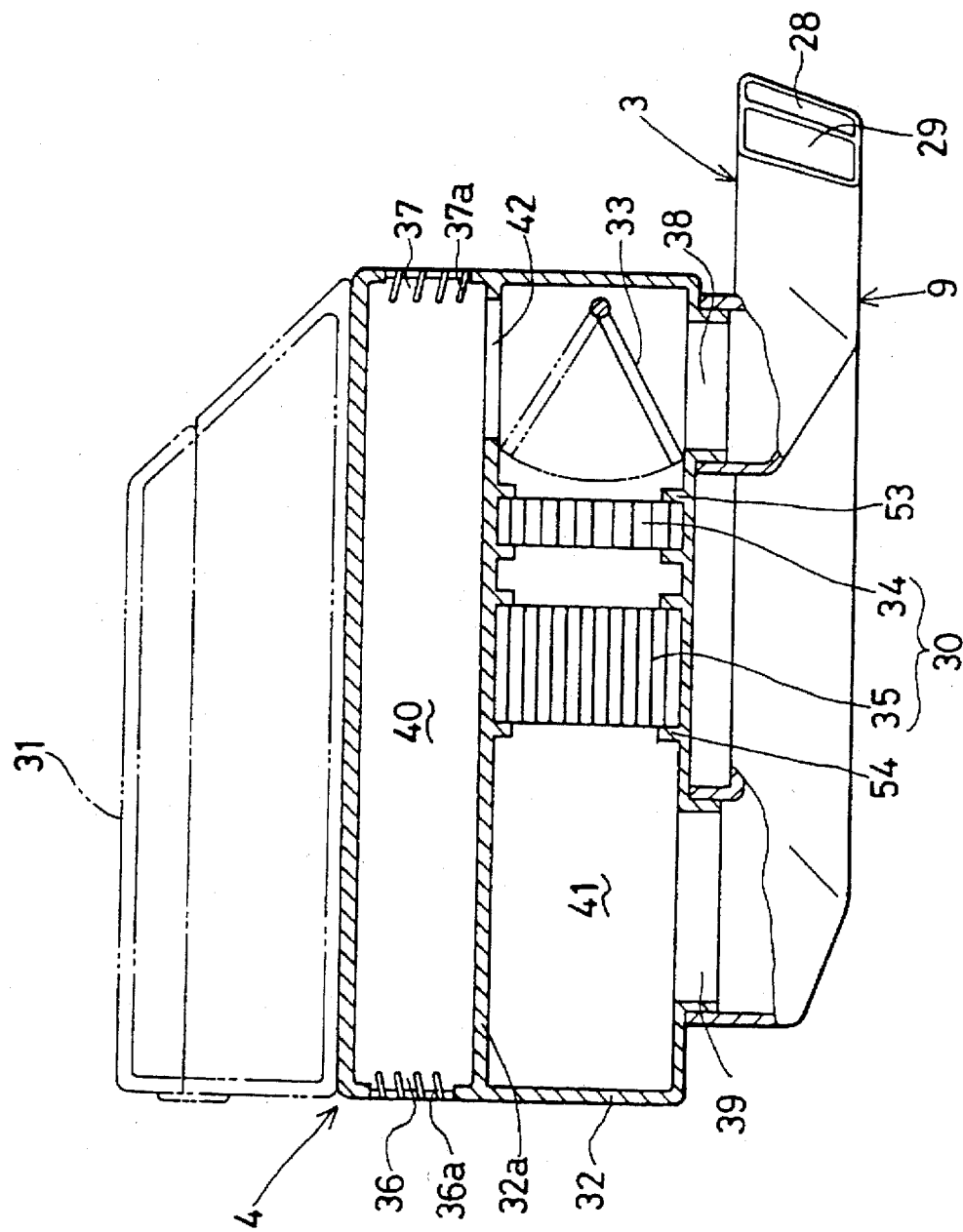
FIG. 3 is a cross-sectional view showing the air cleaning apparatus of the first embodiment.
Figure 4:
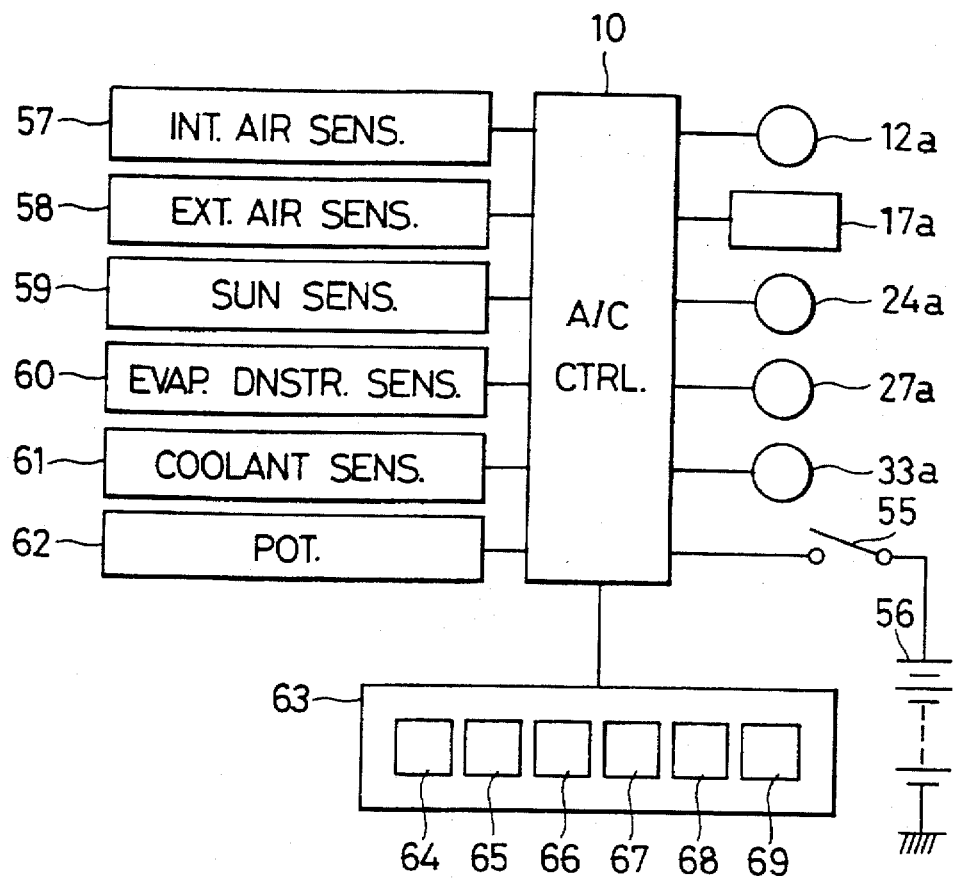
FIG. 4 is a block diagram showing an air conditioner controller and respective air conditioning apparatuses of the first embodiment.

Referring to FIGS. 1 to 3, the duct 3 in this embodiment is shown. The duct 3 includes an internal air inlet 26 for drawing in the air inside the passenger compartment and an inlet switching damper 27. The inlet switching damper 27 serves as route switching means as recited in the appended claims, is driven by an actuator 27a such as a servo motor, and opens and closes the internal air inlet 26. A passage 28 conveying air between the external air inlet 15 of the intake unit 5 and the air cleaning apparatus 4 and a passage 29 conveying air between the air cleaning apparatus 4 and the cleaned air introduction opening 16 of the intake unit 5 are formed within the duct 3.

The air cleaning apparatus 4 is disposed under a console compartment 31 located at the center of the passenger compartment for the automobile and includes, within the unit casing 32, an inlet switching damper 33, a dust removal filter 34 and a deodorant filter 35 which constitute a cleaning unit 30. The unit casing 32 has a front seat side internal air inlet 36 for drawing in air from the passenger compartment from the front seat side of the passenger compartment of the automobile, a rear seat side internal air inlet 36 for drawing in air from the passenger compartment from the rear seat side of the passenger compartment of the automobile, an external air inlet 38 for drawing in air from outside the compartment, and a cleaned air outlet 39 for discharging cleaned air. Louvers 36a, 37a for changing the intake direction of the internal air are pivotably attached to the front and rear side internal air inlets 36, 37. The external air inlet 38 is connected to the external air inlet 15 of the intake unit 5 through the passage 28 of the duct 3 as shown in FIG. 1. The cleaned air outlet 39 is connected to the cleaned air introduction opening 16 of the intake unit 5 through the passage 29 of the duct 3 as shown in FIG. 1.

The unit casing 32 has a diaphragm 32a dividing the inside of the casing into an upper passage 40 through which air drawn in from the front and rear side internal air inlets 36, 37 flows and a lower passage 41 below the upper passage 40. A passage opening 42 is formed on the front side of the diaphragm 32a to connect the upper passage 40 and the lower passage 41. The unit casing 32 constitutes, together with an air conditioning duct 8 and the duct 3, an air conditioner casing 9.

The inlet switching damper 33 is pivotably attached inside the lower passage 41, is driven by an actuator 33a such as a servo motor, and controls the degree of opening between the external air inlet 38 and the passage opening 42. In this embodiment, the external air inlet 38 and the passage opening 42 are selectively opened and closed.

The dust removal filter 34 is disposed at a guide portion 53 formed on a passage wall facing the lower passage 41 of the unit casing 32. The dust removal filter 34 is arranged in a direction perpendicular to the air flowing direction to block the lower passage 41 and serves as a cleaner to remove dust in the air passing therethrough. The deodorant filter 35 also is disposed at a guide portion 54 formed on a passage wall facing the lower passage 41 of the unit casing 32. The deodorant filter 35 is arranged in a direction perpendicular to the air flowing direction to block the lower passage 41 and serves as a cleaner carrying deodorant catalyst (not shown) to remove bad smells (body odor, cigarette odor, etc.) in the air passing therethrough.

Referring to FIGS. 1 to 3, respective routes formed within the air conditioner casing 9 of this embodiment are described. Four routes are formed in the air conditioner casing 9: an external air conditioning priority route; an internal air conditioning priority route; an external air cleaning route; an internal air cleaning route. The damper positions of the respective inlet switching dampers 12, 27, 33 when those routes are formed are shown in TABLE I.

TABLE I

|  | Inlet Sw. Damper 12 | Inlet Sw. Damper 27 | Inlet Sw. Damper 33 |
| --- | --- | --- | --- |
| Ext. A/C Pri. Route | Y | Y | X |
| Int. A/C Pri. Route | X | X | Z |
| Ext. A/C Clean. Route | X | Y | X |
| Int. A/C Clean. Route | X | Y | Y |

It is to be noted that in Table 1, X represents solid line positions of respective inlet switching dampers 12, 27 and 33; Y represents single-dot chain line positions of respective inlet switching dampers 12, 27 and 33; and Z represents the situation where the inlet switching damper 33 can be set either at the solid line position or at the one-dot chain line position.

The external air conditioning priority route is, as shown in TABLE I, a second air flowing route formed within the air conditioner casing 9 when the respective inlet switching dampers 12, 27 and 33 are driven to the damper positions of the external air conditioning priority mode. The external air conditioning priority route introduces external air drawn into the intake unit 5 from the external air inlet 14 into the passenger compartment through the centrifugal fan unit 13, the cooler unit 6 and the heater unit 7.

The internal air conditioning priority route is, as shown in TABLE I, the second air flowing route formed within the air conditioner casing 9 when the respective inlet switching dampers 12, 27 and 33 are driven to the damper positions of the internal air conditioning priority mode. The internal air conditioning priority route introduces internal air drawn into the duct 3 from the internal air inlet 26 into the passenger compartment through the cleaned air introduction opening 16 of the intake unit 5, the centrifugal fan unit 13, the cooler unit 6, and the heater unit 7.

The external air cleaning route is, as shown in TABLE I, a first air flowing route formed within the air conditioner casing 9 when the respective inlet switching dampers 12, 27 and 33 are driven to the damper positions of the external air cleaning mode. The external air cleaning route introduces external air drawn into the intake unit 5 from the external air inlet 15 into the passenger compartment through the passage 28 of the duct 3, the external air inlet 38 of the air cleaning apparatus 4, the duct removal filter 34, the deodorant filter 35, the cleaned air outlet 39, the passage 29 of the duct 3, the cleaned air introduction opening 16 of the intake unit 5, the centrifugal fan unit 13, the cooler unit 6 and the heater unit 7.

The internal air cleaning route is, as shown in TABLE I, the first air flowing route formed within the air conditioner casing 9 when the respective inlet switching dampers 12, 27 and 33 are driven to the damper positions of the internal air cleaning mode. The internal air cleaning route introduces internal air drawn into the air cleaning apparatus 4 from the front and rear seat side internal air inlets 36, 37 into the passenger compartment through the passage opening 28, the duct removal filter 34, the deodorant filter 35, the cleaned air outlet 39, the passage 29 of the duct 3, the cleaned air introduction opening 16 of the intake unit 5, the centrifugal fan unit 13, the cooler unit 6 and the heater unit 7.

Referring to FIGS. 1 to 4, the air conditioner controller 10 according to this embodiment of the present invention is described. The air conditioner controller 10 includes a central processing unit ("CPU"), a RAM, a ROM and an A/D converter as is known in the art. The air conditioner controller 10 is powered by a battery 56 through an ignition switch 55. The air conditioner controller 10 controls air conditioner devices based on respective input signals fed from an internal temperature sensor 57, an external temperature 58, a sunlight sensor 59, a post-evaporation temperature sensor 60, a coolant temperature sensor 61, a potentiometer 62, and an air conditioner control panel 63, etc., as well as a pre-input control program. Also, an actuator 12a for the inlet switching damper 12, a blower drive circuit 17a for the centrifugal fan unit 13, an actuator 24a for an air mix damper 24, an actuator 27a for the inlet switching damper 27, an actuator 33a for the inlet switching damper 33, an actuator (not shown) for an outlet switching damper, etc. are controlled electrically.

The internal temperature sensor 57 corresponds to the internal temperature detecting means as recited in the appended claims; the external temperature sensor 58 corresponds to the external temperature detecting means as recited in the appended claims; the sunlight sensor 59 corresponds to the sunlight detecting means as recited in the appended claims; the post-evaporation temperature sensor 60 corresponds to the post-evaporation temperature detecting means as recited in the appended claims; the coolant temperature sensor 61 corresponds to the coolant temperature detecting means as recited in the appended claims; and the potentiometer 62 corresponds to the damper opening degree detecting means as recited in the appended claims.

The air conditioner control panel 63 is arranged on the front side of the passenger compartment of the automobile and provided with various manual controls, such as an air conditioner switch 64, an automatic operation switch 65, an air amount change switch 66, an inlet setting switch 67, an outlet setting switch 68, a temperature setting switch 69, etc. The air conditioner switch 64 corresponds to the operation command means as recited in the appended claims; the automatic operation switch 65 corresponds to the automatic operation command means as recited in the appended claims; the air amount change switch 66 corresponds to the air amount setting means as recited in the appended claims; the inlet setting switch 67 corresponds to the inlet setting means as recited in the appended claims; the outlet setting switch 68 corresponds to the outlet setting means as recited in the appended claims; and the temperature setting switch 69 corresponds to the temperature setting means as recited in the appended claims.

FIGS. 1 and 4 to 6 show various controls of the air conditioner controller 10. A target air blowing temperature calculation when the automatic operation switch 65 of the air conditioner controller 10 is turned on, or during the automatic control, is first described. The air conditioner controller 10 calculates a target air blowing temperature TAO based on Equation (1):

$$TAO = kset \cdot Tset - kR \cdot TR - kAM \cdot TAM - kS \cdot TS + C \quad (1)$$

where kset is a temperature setting gain parameter, Tset is a set temperature set by the temperature setting switch 69, kR is an internal temperature gain parameter, TR is an internal temperature detected by the internal temperature sensor 57, kAM is external temperature gain parameter, TAM is an external temperature detected by the external temperature sensor 57, kS is a sunlight gain parameter, and TS is a sunlight amount detected by the sunlight sensor 59; and C is a correction coefficient.

In air mix damper control during the automatic control, the air conditioner controller 10 calculates the target damper opening degree SWO of the air mix damper 24 based on Equation (2):

$$SWO = [TAO - (TE+C)]/[TW - (TE+C)] \times 100\% \quad (2)$$

where TAO is the target air blowing temperature from Equation (1), TE is a post-evaporation temperature detected by the post-evaporation temperature sensor 60, TW is a coolant temperature detected by the coolant temperature sensor 61, and C is a correction coefficient.

Figure 5:
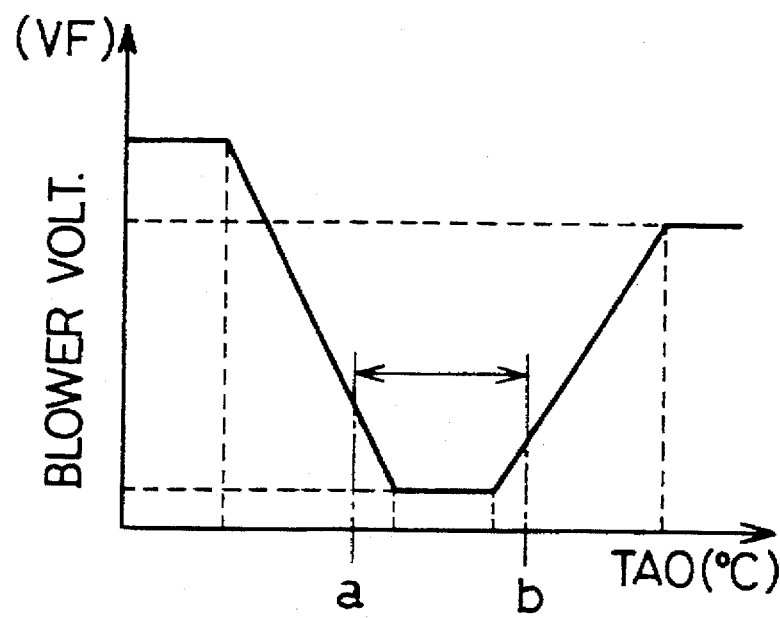
FIG. 5 is a graph showing blower voltage characteristics based on target blowing temperature in the embodiment.

When performing blower voltage control during automatic control, the blowing amount of the centrifugal fan 18 (or applied voltage to the blower motor 17) is determined by blower air amount characteristics as shown in FIG. 5 based on the target air blowing temperature TAO previously stored in the ROM after a predetermined period, e.g., 15 seconds, has passed since turning on the ignition switch 55 or since the coolant temperature as detected by the coolant temperature sensor 61 is found to be a predetermined temperature or above (e.g., 70° C. or above) after the engine has been started. The air conditioner controller 10 applies the voltage thus determined to the blower motor 17 as a blower voltage VF. In this blower voltage control based on the target air blowing temperature TAO, a blowing amount of the centrifugal fan 18 is controlled in sixteen steps from the strongest airflow to the weakest airflow.

The centrifugal fan 18 is automatically controlled by the air conditioner controller 10 through the blower drive circuit 17a based on the determined blower air amount characteristics. The air conditioner controller 10 controls the blower drive circuit 17a to maintain the blower voltage VF set by the air amount change switch 66 when the air amount change switch 66 is manually controlled while the automatic operation switch 65 is turned on, because the blower voltage VF set by the air amount change switch has priority. The blower air amount characteristics based on the target air blowing temperature TAO can be differentiated based on the differences of the air outlet mode or on the differences of size and position in the passenger compartment.

In regular air conditioning range determination control, a determination is made as to whether the air conditioning situation in the passenger compartment is in a regular range. The air conditioner controller 10 determines, as shown in the graph in FIG. 5, that the air conditioning situation in the passenger compartment is in the regular air conditioning range when it reaches the target air blowing temperature TAO such that the blower voltage VF indicates a low load (weak airflow side), or when it reaches the regular operation range (a to b range) of the centrifugal fan 18. On the other hand, the controller 10 determines that the air conditioning situation in the passenger compartment is in the irregular air conditioning range when the blower voltage VF indicates a high load, or when it reaches the irregular operation range of the centrifugal fan 18.

The air conditioner controller 10 calculates a damper opening degree difference DSW (%) between the target damper opening degree SWO from Equation (2) and the current damper opening degree SW of the air mix damper 24 detected by the potentiometer 62 based on Equations (3) and (4):

$$\Delta SW = (SWO - SW) \times 100\% \quad (3)$$

$$\alpha \leq \Delta SW \leq \beta \quad (4)$$

where a is, e.g., −5 (%) and b is, e.g., +5 (%).

As indicated in Equation (4), when the damper opening degree difference DSW is close to 0, or when it reaches the regular operation range of the air mix damper 24, the controller 10 determines that the air conditioning situation in the passenger compartment is in the regular air conditioning range. On the other hand, when the target damper opening degree SWO is greatly different from the current damper opening degree SW, the controller 10 determines that the air conditioning situation in the passenger compartment is in the irregular air conditioning range. It is to be noted that the approximate value (between a and b of the graph in FIG. 5) of the target air blowing temperature TAO and the approximate value of the damper opening degree difference DSW may vary depending on the space size of the passenger compartment, differences of sunlight amounts, differences of boarding positions (front or rear, or left or right seat), etc., so that the regular determination range can be changed arbitrarily.

Figure 6:
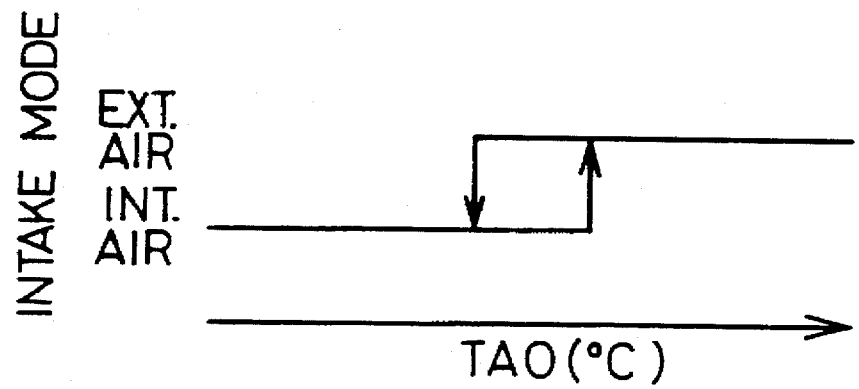
FIG. 6 is a graph showing inlet mode control characteristics based on target blowing temperature.

In inlet mode control during the automatic control, the control condition of the inlet switching dampers 12, 27 and 33 is determined by the inlet mode control characteristics or inlet mode control schedule as shown by the graph in FIG. 6 based on the target air blowing temperature TAO and by the regular air conditioning range determination control. That is, according to the inlet mode control characteristics based on the target air blowing temperature TAO, the regular air conditioning range determination control selects either of the air conditioning priority mode (the external air conditioning priority mode or the internal air conditioning priority mode), or cleaning air conditioning mode (the external air cleaning mode or the internal air cleaning mode) after either of the external air introduction mode for introducing external air in the passenger compartment and the internal air circulation mode for circulating internal air in the passenger compartment is selected.

The inlet switching dampers 12, 27 and 33 are driven, as shown in TABLE I, by the corresponding actuators 12a, 27a and 33a to implement the selected one of the external air conditioning priority mode, the internal air conditioning priority mode, the external air cleaning mode, and the internal air cleaning mode. When the inlet setting switch 67 is manually controlled while the automatic operation switch 65 is turned on, the air conditioner controller 10 commands the respective actuators 12a, 27a, 33a to maintain the inlet mode since the inlet mode set by the inlet setting switch 67 takes priority.

Figure 7:
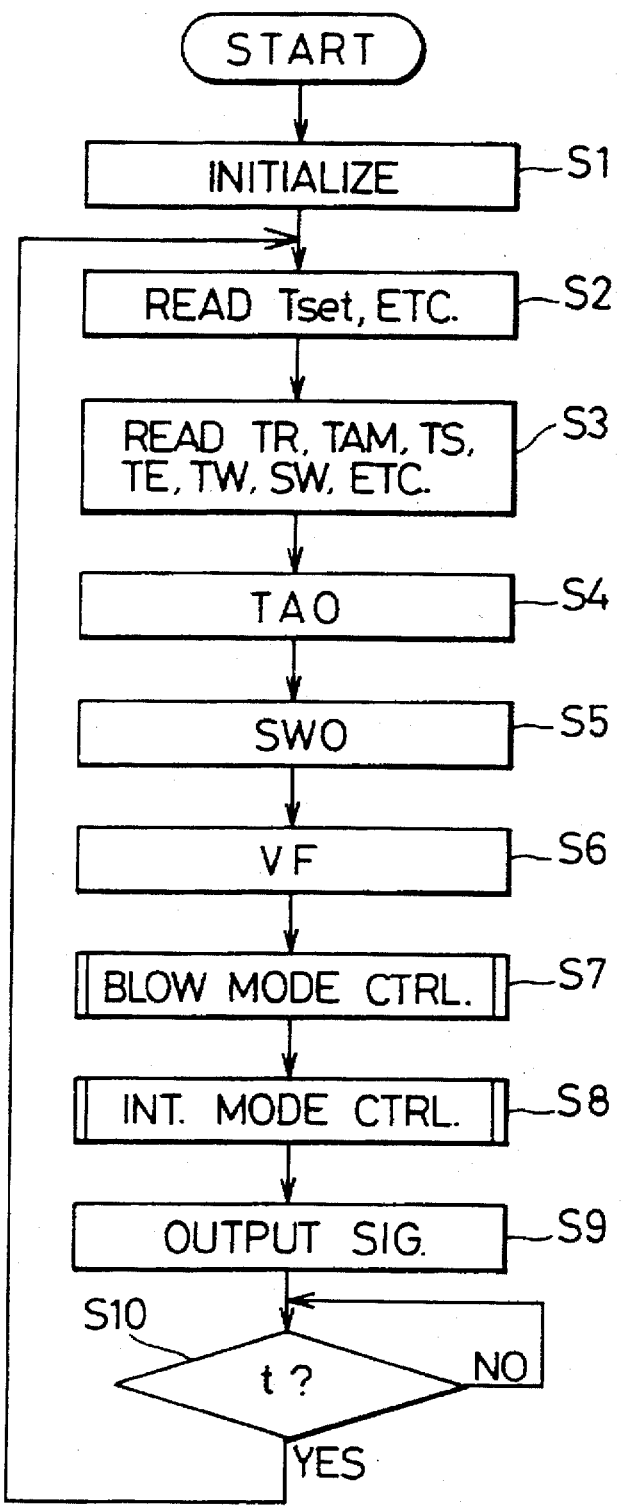
FIG. 7 is a flowchart showing a main control program for the first embodiment.

The operation of the automatic air conditioner 1 for the automobile in this embodiment will now be described. FIG. 7 shows a flowchart illustrating a basic control program of the air conditioner controller 10. The program shown in FIG. 7 starts when the ignition switch 55 and the automatic operation switch 65 are turned on and ends when the ignition switch 55 is turned off.

First, the respective timers, control values, etc. are initialized (Step S1). The control signals from the various manual control devices, such as the air conditioner switch 64, the automatic operation switch 65, the air amount change switch 66, the inlet setting switch 67, the outlet setting switch 68, the temperature setting switch 69, etc., which are arranged on the air conditioner control panel 63 are read into the controller 10 (Step S2). That is, for example, the set temperature (Tset) set by the temperature setting switch 69 is read into the controller 10.

Then, input signals are read from the various sensors to detect a vehicle environmental situation affecting the air conditioning situation in the passenger compartment (Step S3). That is, the internal air temperature TR detected by the internal air temperature sensor 57, the external air temperature TAM detected by the external air temperature sensor 58, the sunlight amount TS detected by the sunlight sensor 59, the post-evaporation temperature TE detected by the post-evaporation temperature sensor 60, the coolant temperature TW detected by the coolant temperature sensor 61 and the current damper opening degree SW detected by the potentiometer 62 are read.

Subsequently, based on Equation (1) described above, the target air blowing temperature TAO is calculated (Step S4). Then, the target damper opening degree SWO of the air mix damper 24 is calculated according to Equation (2) described above (Step S5). The blower voltage VF is then determined according to the blower voltage characteristics as shown in the graph of FIG. 5 based on the target air blowing temperature TAO (Step S6). The outlet mode is determined according to the outlet mode control characteristics (not shown) based on the target air blowing temperature TAO (Step S7).

Then, the controller 10 executes inlet mode control as a main feature of the invention (Step S8) to determine the positions of the respective inlet switching dampers 12, 27 and 33. Subsequently, the blower voltage VF, the control signals, and the damper position signals, which are determined at Steps S5 to S8, are fed to the blower drive circuit 17a and the actuators 12a, 27a and 33a to operate the inlet switching dampers 12, 27 and 33, the centrifugal fan unit 13, the air mix damper 24 and the outlet switching damper (Step S9).

A determination is made as to whether a control period time t has passed since the control at Step S9 has been implemented (Step S10). If the result is "No," the controller 10 waits until the control period time t has elapsed. If the result at Step S10 is "Yes," the controller 10 returns to Step S2 and repeats the calculation and processes described above. The automatic air conditioner 1 for the automobile is thus automatically controlled by repeatedly executing the calculation and processes described above.

Figure 8:
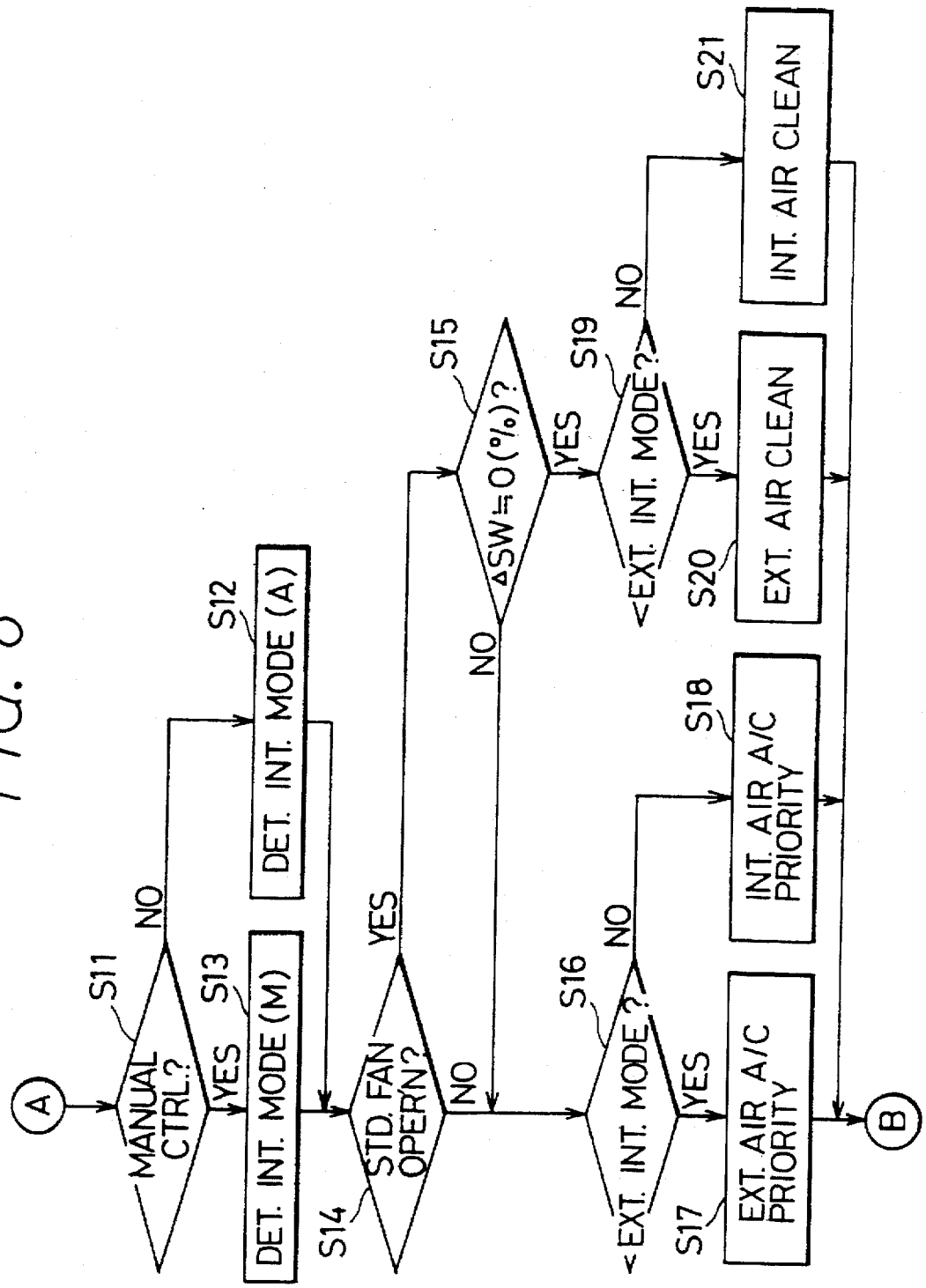
FIG. 8 is a flowchart showing a subroutine for inlet mode control for the first embodiment.

The inlet mode control is described in detail in FIG. 8, which shows the flowchart as a subroutine of the inlet mode control. The control in the flowchart starts when the control at Step S7 in FIG. 7 is completed.

First, a determination is made as to whether the inlet setting switch 67 is manually controlled (Step S11). If the determination result is "No," the controller 10 selects either the external air introduction mode or the internal air circulation mode according to the inlet mode control characteristics as shown in FIG. 6 based on the target air blowing temperature TAO (Step S12), and then goes to Step S14. If the determination result is "Yes," the controller 10 selects the inlet mode to be the external air introduction mode or the internal air circulation mode, which are set by the inlet setting switch 67 (Step S13).

Next, a determination is made as to whether the air conditioning situation in the passenger compartment reaches the regular air conditioning range. That is, it is determined whether the blowing air amount of the centrifugal fan 18, or the blower voltage VF, reaches the regular operation range (Step S14). If the determination result is "No," the controller 10 goes to step S16. If the determination result at step S14 is "Yes," the damper opening degree difference DSW is calculated in accordance with Equation (3) above, and the controller 10 determines whether the damper opening degree difference DSW is approximately zero. That is, it is determined whether the damper opening degree SWO calculated in Equation (2) is approximately the current damper opening degree SW of the air mix damper 24 detected by the potentiometer 62 (Step S15).

If the determination result at Step S15 is "No," or if the air conditioning situation of the passenger compartment is in the irregular air conditioning range, i.e., the temperature control priority operation range, the controller 10 determines whether the inlet mode determined at Step 12 or Step 13 is the external air introduction mode (Step S16). If the determination result is "Yes," the damper positions of the inlet switching dampers 12, 27 and 33 are set to the damper positions for the external air conditioning priority mode as shown in TABLE I (Step S17). Then, the control moves to Step S9 in FIG. 7. If the determination result at Step 16 is "No," the damper positions of the inlet switching dampers 12, 27 and 33 are set to the damper positions for the internal air conditioning priority mode as shown in TABLE I (Step S18). Then, control moves to Step S9 in FIG. 7.

If the determination result at Step S15 is "Yes," or if the air conditioning situation of the passenger compartment is in the regular air conditioning range, i.e., the air cleaning operation range, the controller 10 determines whether the inlet mode determined at Step S12 or Step S13 is the external air introduction mode (Step S19). If the determination result is "Yes," the damper positions of the inlet switching dampers 12, 27 and 33 are set to the damper positions for the external air cleaning mode as shown in TABLE I (Step S19). Then, control moves to Step S9 in FIG. 7. If the determination result at Step 19 is "No," the damper positions of the inlet switching dampers 12, 27 and 33 are set to the damper positions for the internal air cleaning mode as shown in TABLE I (Step S20). Then, control moves to Step S9 in FIG. 7.

When the set temperature Tset set by the temperature setting switch 69 is very different from the internal air temperature TR detected by the internal air temperature sensor 57, e.g., when the automobile is parked in the sizzling summer sun or when it parked during a night of bleak winter, passengers become eager for the quickest temperature control, rather than for air cleaning. In this embodiment, the air conditioner controller 10 determines, according to the blower voltage characteristic based on the target air blowing temperature TAO and the damper opening degree SWO of the air mix damper 24 based on the target damper opening degree SWO, whether the air conditioning situation, or the atmosphere, of the passenger compartment of the automobile is in the regular air conditioning range or in the irregular air conditioning range, thereby switching the air blowing route in the air conditioner casing 9.

Accordingly, if the air conditioning situation of the passenger compartment is in the irregular air conditioning range, or namely, if the external air introduction mode is selected by the automatic control or manual control during cooling or heating where the set temperature Tset and the internal air temperature TR are significantly different from each other, the external air conditioning priority mode is selected as described above. If this external air conditioning priority mode is selected, as shown in TABLE I, the inlet switching damper 12 is shifted to the Y position (the one-dot chain line in FIG. 1); the inlet switching damper 27 is shifted to the Y position (the one-dot chain line in FIG. 1); and the inlet switching damper 33 is shifted to the X position (the solid line in FIG. 1). An external air conditioning route is thereby formed in the air conditioner casing 9 so that the external air drawn into the intake unit 5 from the external inlet 14 is blown into the passenger compartment after being air-conditioned at the air conditioning unit 2, in which the air amount is controlled by the centrifugal fan unit 13 and the air flowing amount is controlled by the evaporator 22, the air mix damper 24, and the heater core 25 in detouring around the air cleaning apparatus 4.

Similarly, if the air conditioning situation of the passenger compartment is in the irregular air conditioning range and the internal air circulation mode is selected, the controller 10 selects the internal air conditioning priority mode as described above. If the internal air conditioning priority mode is selected, as shown in TABLE I, the inlet switching damper 12 is shifted to the X position (the solid line in FIG. 1); the inlet switching damper 27 is shifted to the X position (the solid line in FIG. 1); and the inlet switching damper 33 is shifted to the Z position (the one-dot chain line or solid line in FIG. 1). An internal air conditioning route is thereby formed in the air conditioner casing 9 so that the internal air drawn in from the internal air inlet 26 into the duct 3 detours around the air cleaning apparatus 4 and is blown into the passenger compartment after being air-conditioned at the air conditioning unit 2.

When a predetermined time after the automatic air conditioner 1 for the automobile has started to operate has passed and when the air conditioning situation of the passenger compartment reaches the air conditioning regular range, or namely, when the blower voltage characteristics based on the target air blowing temperature TAO reach the regular operation range of the centrifugal fan 18 (i.e., between a and b in the graph of FIG. 5) and when the current damper opening degree SW is approximately equal to the target damper opening degree SWO ($\alpha \leq SWO-SWE \leq \beta$), the external air cleaning mode is selected, as described above, if the external air introduction mode has been selected.

When this external air cleaning mode is selected, as shown in TABLE I, the inlet switching damper 12 is shifted to the X position (the one-dot chain line position in FIG. 1); the inlet switching damper 27 is shifted to the Y position (the one-dot chain line position in FIG. 1); and the inlet switching damper 33 is shifted to the X position (the solid line position in FIG. 1). An external air cleaning route is thereby formed in the air conditioner casing 9, so that the external air drawn in from the external air inlet 15 into the intake unit 5 passes through the air cleaning apparatus 4 by way of the duct 3 and is blown into the passenger compartment after air-conditioned at the air conditioning unit 2.

The external air flows at that time within the air cleaning apparatus 4 as follows. As shown in FIG. 3, with the external air drawn in from the external air inlet 15 and flowing into the lower passage 41 of the unit casing 32 from the external air inlet 38 after passing through the passage 28 of the duct 3, dust is removed when the air passes through the dust removal filter 34 blocking the lower passage 41, and then, bad odors (body odor, smoking odor, etc.) are trapped at the deodorant catalyst carried by the deodorant filter 35 blocking the lower passage 41 when the air passes through the filter 35. The external air thus cleaned is discharged outside the air cleaning apparatus 4 from the cleaned air outlet 39 and is air-conditioned by the air conditioning unit 2 (shown in FIG. 1) after flowing therein to by passing through the passage 29 of the duct 3. The cleaned and air conditioned external air is then blown into the passenger compartment.

Similarly, if the air conditioning situation of the passenger compartment is in the regular air conditioning range and the internal air circulation mode is selected, the controller 10 selects the internal air cleaning mode as described above. If the internal air cleaning mode is selected, as shown in TABLE I, the inlet switching damper 12 is shifted to the X position (the solid line position in FIG. 1); the inlet switching damper 27 is shifted to the Y position (the one-dot chain line position in FIG. 1); and the inlet switching damper 33 is shifted to the Y position (the one-dot chain line position in FIG. 1). An internal air cleaning route is thereby formed in the air conditioner casing 9 so that the internal air drawn in from the front and rear seat side internal air inlets 36, 37 opening at the center of the passenger compartment into the air cleaning apparatus 4 directly flows into the cleaning unit through the upper passage 40 and the passage opening 42. The internal air flowing into the cleaning unit is air-conditioned at the air conditioning unit 2 by being sent thereto through the passage 29 after cleaned in a manner described above when passing through the dust removal filter 34 and the deodorant filter 35. The cleaned and air-conditioned internal air is blown into the passenger compartment.

As described above, the automatic air conditioner 1 for the automobile can avoid increased pressure loss problems due to the dust removal and deodorant filters 34, 35 because the conditioner 1 is capable of switching the air flowing route according to the external or internal air conditioning priority mode in which the air is flown through the air conditioning unit 2 in detouring around the air cleaning apparatus 4. The smaller pressure loss in the air flowing passage in the air conditioner casing 9 can prevent the air amount of the centrifugal fan 18 from being lowered, so that the period up to that in which the air conditioning situation in the passenger compartment reaches the regular air conditioning range can be made very short.

Once the air conditioning situation in the passenger compartment reaches the regular air conditioning range, the conditioner 1 can select the external or internal air cleaning mode in which the air flows through the air cleaning apparatus 4 and the air conditioning unit 2 so that the air cleaned by the dust removal filter 34 and the deodorant filter 35 is air-conditioned at the air conditioning unit 2 and blown into the passenger compartment. Accordingly, when the air conditioning situation in the passenger compartment reaches the regular air conditioning range, the conditioner 1 can not only air-condition the passenger compartment but also clean the air, thereby rendering the atmosphere of the passenger compartment more comfortable.

During the internal air cleaning mode, uncleaned air in the passenger compartment is drawn into the unit casing 32 through the front and rear seat side internal air inlets 36, 37 formed at the air cleaning apparatus 4 arranged at the center of the passenger compartment of the automobile and can be cleaned directly by the dust removal filter 34 and the deodorant filter 35. The air in the passenger compartment can be cleaned quickly. Since the air is blown from the air conditioning unit 2, high or low temperature air in the passenger compartment can be drawn in from the center portion of the passenger compartment into the air conditioner casing 9 so that the air conditioning unit 2 can quickly control the temperature.

Figure 9:
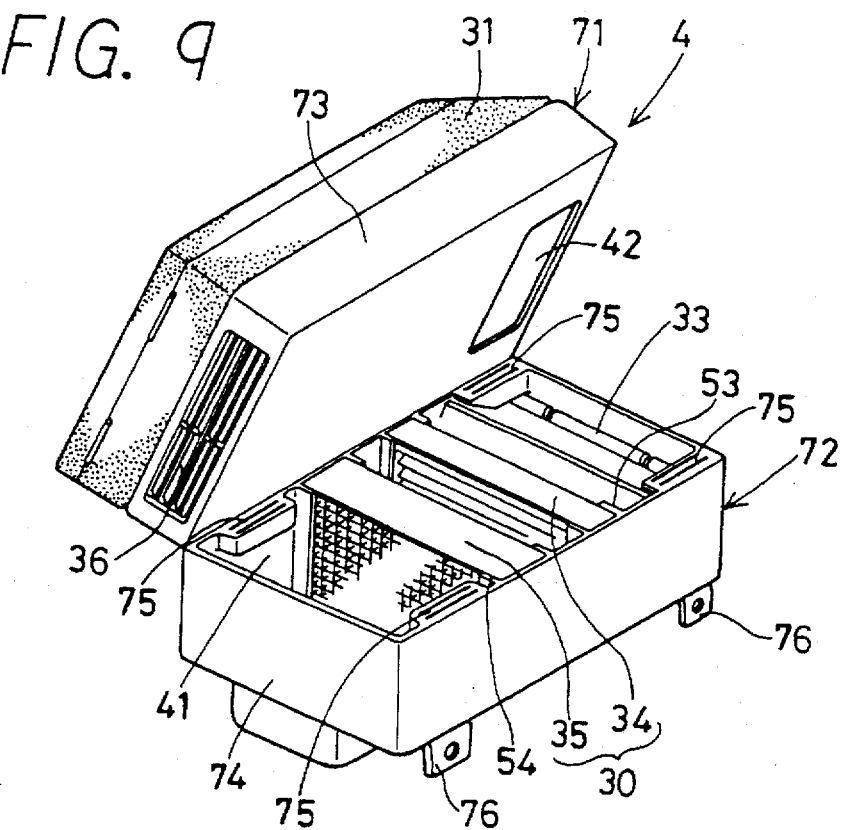
FIGS. 9 and 10 are perspective views showing respective air cleaning apparatuses according to the embodiment.

Referring to FIG. 9, an air conditioning apparatus according to a second embodiment of the invention is shown. The air cleaning apparatus 4 in this embodiment is formed as a separate body from the air conditioning unit 2 and is mounted at the center of the passenger compartment of the automobile. The air cleaning apparatus 4 is formed so that an internal air intake unit 71 having the upper passage 40 and a cleaning unit 72 having the dust removal filter 34 and the deodorant filter 35 are separable from one another. A unit casing 73 of the internal air intake unit 71 is made of a magnetic material such as a steel plate, and a magnet or magnets 75 are attached to the top face of a unit casing 74 of the cleaning unit 72 to attract the unit casing 73. The unit casing 73 is attached to the unit casing 74 so that it can open and close the casing 74, and brackets 76 are attached to the unit casing 74 to secure the unit casing 74 to the vehicle body.

In this embodiment, when the dust removal filter 34 traps a large amount of dust to increase the airflow resistance of the dust removal filter 34 or to impair its filtering performance, the unit casing 74 can be opened and permits the dust removal filter 34 to be taken out from the guide 53 of the lower passage 41, thereby enabling easier replacement, regeneration work and maintenance work on the dust removal filter 34. Similarly, when the deodorizing performance of the deodorant catalyst in the deodorant filter 35 is impaired, the deodorant filter 35 can be taken out from the guide 54 of the lower passage 41 of the unit casing 74, thereby enabling easier replacement or regeneration work, or maintenance work, of the deodorant filter 35.

Figure 11:
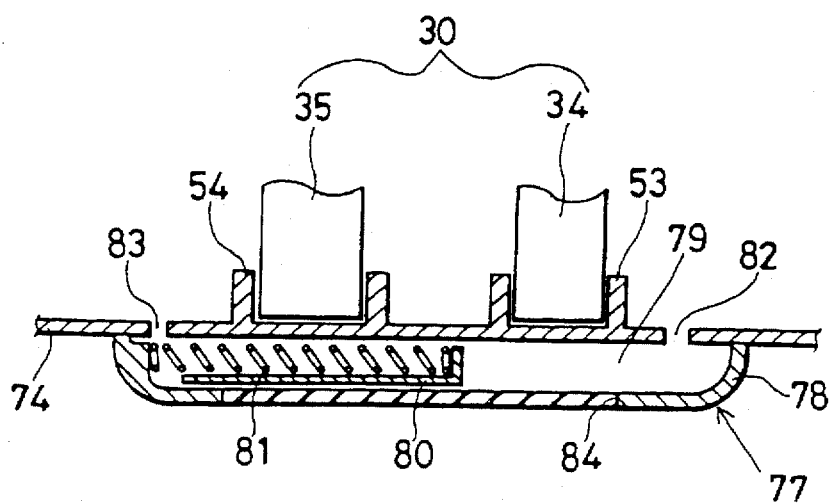
FIG. 11 is a cross-sectional view showing a maintenance meter of the air cleaning apparatus.
Figure 10:
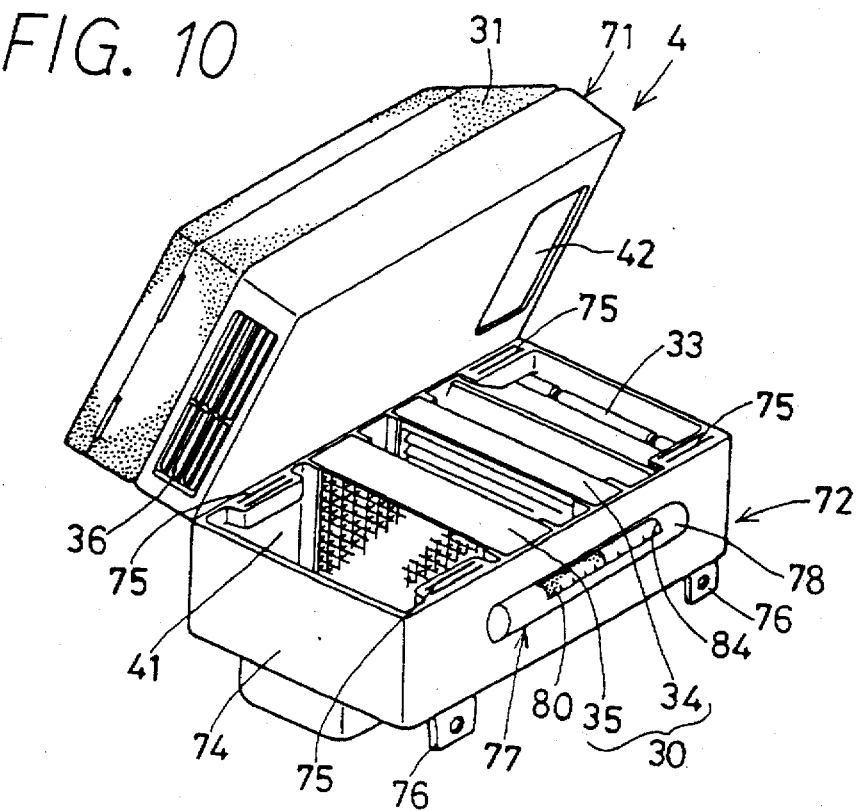

FIGS. 10 and 11 show a third embodiment of the invention, in which FIG. 10 shows an air cleaning apparatus as a separate unit from the air conditioning unit and FIG. 11 shows a maintenance meter 77 arranged on the air cleaning apparatus. In this embodiment, the maintenance meter 77, as an indicator, is provided on a side wall of the unit casing 74 so that a passenger can confirm the maintenance status, i.e., the replacement status or regeneration status, of the dust removal filter 34 and the deodorant filter 35.

The maintenance meter 77 includes a cover 78 formed on the side wall of the unit casing 74, a float 80 movably provided in a pressure chamber 79 formed between the cover 78 and the unit casing 74, a spring 81 or other resilient device for urging the float 80 to its initial position side, and the like. The unit casing 74 is formed with an intake hole 82 for drawing air from the lower passage 41 located on the upstream side of the dust removal filter 34 into the pressure chamber 79 and an exhaust hole 83 for discharging air from the pressure chamber 79 into the lower passage 41 located on the downstream side of the deodorant filter 35. The cover 78 has an observation window 84 so that a passenger can observe the position of the float 80. The observation window 84 is formed by inlaying a transparent resin or glass in the cover 78. The float 80 is colored so that a passenger can observe it easily, and it travels in accordance with the pressure difference between the pressure in the lower passage 41 on the upstream side of the dust removal filter 34 and the pressure in the lower passage 41 on the downstream side of the deodorant filter 35.

With this embodiment, when the dust removal filter 34 and the deodorant filter 35 of the air cleaning apparatus 4 are used for a long time, a large amount of dust is trapped at the dust removal filter 34 and bad odors are removed by the deodorant catalyst of the deodorant filter 35, thereby increasing airflow resistance at the dust removal filter 34 and the deodorant filter 35. When the pressure in the lower passage 41 on the downstream side of the deodorant filter 35 become much lower than the pressure in the lower passage 41 on the upstream side of the dust removal filter 34, the float 80 travels toward the left side in FIG. 11 when overcoming the urging force of the spring 81. If the float 80 shifts to a certain position, the passenger may determine that it is time to replace or regenerate either or both of the dust removal filter 34 and the deodorant filter 35.

Figure 12:
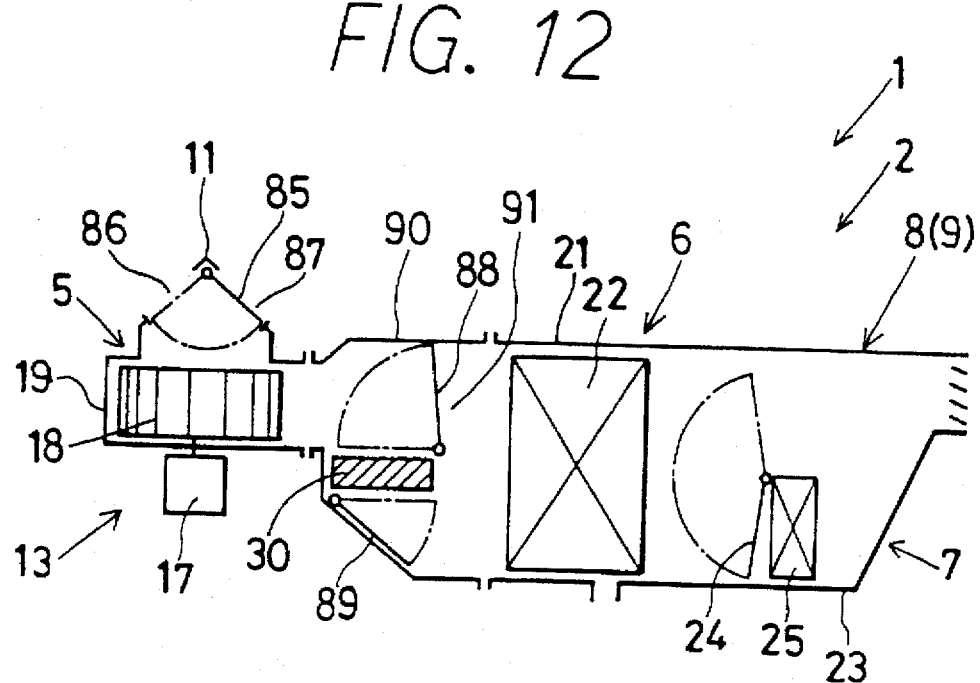
FIGS. 12 and 13 show air conditioning units incorporating air cleaning apparatuses according to the embodiment.

FIG. 12 shows a fourth embodiment of the invention in which a cleaning unit 30 equipped with the dust removal filter 34 and the deodorant filter 35 is installed within the air conditioning duct 8 of the air conditioning unit 2. Reference numeral 85 represents an internal-external air switching damper. An external air inlet 86 and an internal air inlet 87 are formed in the unit casing 11 of the intake unit 5. Dampers 88, 89 are pivotably attached in the air conditioning duct 8 to switch the air flowing route. A bypass route 91 is formed at a unit casing 90 containing the cleaning unit 30 by enclosing the cleaning unit 30 with the switching dampers 88, 89 to bypass the cleaning unit 30.

In the air conditioning duct 8, the air conditioning priority route and the air cleaning route are formed. The air conditioning priority route is the second air flowing route in which air drawn in from the external air inlet 86 or the internal air inlet 87 into the unit casing 11 is introduced into the passenger compartment through the centrifugal fan unit 13, the bypass route 91, the cooler unit 6 or the evaporator 22, and the heater unit 7. The air cleaning route is the first air flowing route in which air drawn in from the external air inlet 86 or the internal air inlet 87 into the unit casing 11 is introduced into the passenger compartment through the centrifugal fan unit 13, the cleaning unit 30, the cooler unit 6 or the evaporator 22, and the heater unit 7.

With this fourth embodiment, when the air conditioning situation in the passenger compartment reaches the regular air conditioning range, the air cleaning route in the air conditioning duct 8 is formed by driving the switching dampers 88, 89 to the positions indicated by the solid lines. When the air conditioning situation in the passenger compartment reaches the irregular air conditioning range, the air conditioning priority route in the air conditioning duct 8 is formed by driving the switching dampers 88, 89 to the positions indicated by the one-dot chain lines. When the air conditioning situation in the passenger compartment is in the irregular air conditioning range, the resistance against airflow due to the dust removal filter 34 and the deodorant filter 35 is not increased, thus reducing the pressure loss in the air conditioning duct 8 and preventing the air amount of the centrifugal fan 18 from being impaired. When the cleaning unit 30 is subject to regeneration or replacement work, the cleaning unit 30 is taken out from the air conditioning duct 8.

Figure 13:
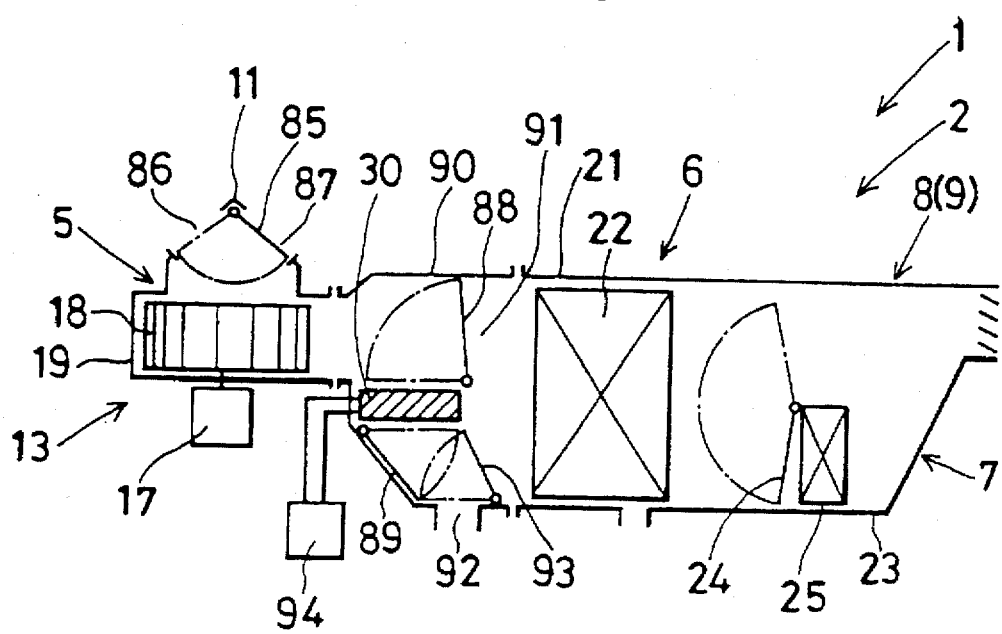

FIG. 13 shows a fifth embodiment of the invention in which an exhaust damper 93 closes and opens an exhaust opening 92 in a unit casing 90. The air conditioner 1 for the automobile is equipped with a regenerator 94 for regenerating the cleaning unit 30.

The exhaust damper 93 corresponds to the opening and closing means, or pivotal door means, as recited in the appended claims and opens the exhaust opening 92 so that, after the cleaning unit 30 is regenerated, the material removed from the cleaning unit 30 is not blown into the passenger compartment. The regenerator 94 corresponds to the regenerating means as recited in the appended claims and shakes away the dust trapped in the dust removal filter 34 by vibrating the dust removal filter 34 and also divests the deodorant filter 35 of collected odors by heating its deodorant catalyst, or is a vacuum device for removing dust.

In this embodiment, the cleaning unit 30 can be regenerated even if the cleaning unit 30 is placed at a position where the cleaning unit 30 cannot be taken out readily, unlike when it is disposed in the air conditioning duct 8. After the cleaning unit 30 is regenerated by the regenerator 94, the exhaust damper 93 is opened for a certain period, e.g., one minute, and the dust and bad odors are discharged outside the passenger compartment through the exhaust opening 92 by operation of the centrifugal fan 18. The dust and bad odors removed by the cleaning unit 30 therefore cannot be discharged inside the passenger compartment. Since heat of the deodorant catalyst of the deodorant filter 35 can be taken away quickly by the air sent by the centrifugal fan 18, the cleaning unit 30 can quickly be made ready for cleaning.

It should be noted that damper 89 is not essential to the operation of the fourth and fifth embodiments. That is, airflow can be directed as desired by using only damper 88; however, when the cleaning unit 30 includes a catalytic deodorant element or the like as described above, closing both sides of the cleaning unit 30 off from airflow during the heating and regeneration process minimizes the amount of heat diverted away from the catalytic element.

It is to be noted that, for example, the cleanness in the passenger compartment may be detected by using odor sensors, dust sensors, etc., and thereby, the mode can be changed from the external or internal air conditioning priority mode to the external or internal air cleaning mode.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An air conditioning system for vehicle comprising:
   air conditioning means for air-conditioning air passing therethrough;
   air cleaning means for cleaning air passing therethrough;
   an air conditioner casing having a first air flowing route to permit air to flow into a passenger compartment through the air conditioning means and the air cleaning means and a second air flowing route to permit air to flow into the passenger compartment through the air conditioning means while detouring around the air cleaning means;
   fan means for generating airflow within the air conditioner casing and directing said airflow into the passenger compartment; and
   route switching means for switching from the first air flowing route to the second air flowing route when an air conditioning situation in the passenger compartment is in an irregular air conditioning range.

2. The air conditioning system according to claim 1, wherein the route switching means is for switching the second air flowing route to the first air flowing route when the air conditioning situation in the passenger compartment is in a regular air conditioning range.

3. The air conditioning system according to claim 1, wherein the air cleaning means is disposed at a center of the passenger compartment, and the air conditioner casing includes, around the air cleaning means, an internal air inlet for drawing in internal air in the passenger compartment.

4. The air conditioning system according to claim 1, wherein the air conditioner casing includes an exhaust opening for discharging air having passed through the air cleaning means, and pivotal door means for selectively opening and closing the exhaust opening.

5. The air conditioning system according to claim 1, wherein:
   the air cleaning means includes a dust removal filter for removing dust in air flowing within the air conditioner casing; and
   said system further comprises regenerating means for regenerating the dust removal filter by vibrating the dust removal filter.

6. The air conditioning system according to claim 1, wherein:
   the air cleaning means includes a deodorant filter having deodorant catalyst deodorizing air flowing within the air conditioner casing; and
   said system further comprises regenerating means for regenerating the deodorant catalyst by heating the deodorant catalyst.

7. An air delivery system comprising:
   an air temperature adjustment unit;
   an intake unit having an intake opening and an exit opening;
   air cleaning means disposed in said intake unit; and
   switching means for selectively forming a first airflow route in said intake unit in which air from said intake opening flows to said exit opening via said air cleaning means and a second airflow route in said intake unit in which air from said intake opening flows to said exit opening without flowing through said air cleaning means,
   wherein:
      said intake opening is an exterior air intake opening; and
      said intake unit includes an internal air inlet and an inlet switching damper for selectively directing air from said air cleaning means, and from an interior of a vehicle via said internal air inlet, to said exit opening.

8. An air delivery system comprising:
   an air temperature adjustment unit;
   an intake unit having an intake opening and an exit opening;
   air cleaning means disposed in said intake unit; and
   switching means for selectively forming a first airflow route in said intake unit in which air from said intake opening flows to said exit opening via said air cleaning means and a second airflow route in said intake unit in which air from said intake opening flows to said exit opening without flowing through said air cleaning means,
   wherein said intake opening is an exterior air intake opening, and
   said intake unit includes an interior air intake cleaning opening and an inlet switching damper for selectively directing air from said exterior air intake opening and from said interior air intake cleaning opening to said exit opening.

9. An air delivery system comprising:
   an air temperature adjustment unit;
   an intake unit having an intakes and an exit opening;
   air cleaning means disposed in said intake unit; and
   switching means for selectively forming a first airflow route in said intake unit in which air from said intake opening flows to said exit opening via said air cleaning means and a second airflow route in said intake unit in which air from said intake opening flows to said exit opening without flowing through said air cleaning means;

detecting means for generating signals representative of environmental parameters related to interior air in a passenger compartment of a vehicle; and control means connected to said detecting means and said switching means for detecting a regular condition and an irregular condition of said interior air based on said signals generated by said control means and for controlling said switching means to form said first air flowing route responsive to detection of a regular condition and to form said second air flowing route responsive to detection of an irregular condition.

10. The system of claim 9, said detecting means comprising:

an interior air temperature detector for detecting a temperature of said interior air;

wherein said control means is for detecting said regular condition when a difference between said interior air temperature and a predetermined target temperature is less than a predetermined value; and said control means is for detecting said irregular condition when said difference is greater than said predetermined value.

11. A method of controlling air in an air delivery system, said method comprising the steps of:

sensing a condition of interior air in a passenger compartment of a vehicle;

when said interior air is in a regular condition, directing air to an air temperature adjustment device via an air cleaner; and when said interior air is in an irregular condition, directing air to said air temperature adjustment device without directing said air through said air cleaner.

12. The method of claim 11, said sensing step including a step of sensing a temperature of said interior air.

13. The method of claim 12, said sensing step further including the steps of:

determining the existence of said regular condition when a difference between said interior air temperature and a target air temperature is less than a predetermined value; and determining the existence of said irregular condition when a difference between said interior air temperature and said target temperature is greater than said predetermined value.

14. The method of claim 11, said step of directing air to said air temperature adjustment device via said cleaning device comprising the steps of:

detecting the existence of an exterior mode and interior mode;

providing air from an exterior of said vehicle passenger compartment to said cleaning device during said exterior mode; and providing said interior air to said cleaning device during said interior mode.

15. The method of claim 11, said step of directing air to said temperature adjustment device without directing said air thorough said cleaning device comprising the steps of:

detecting the existence of an exterior mode and an interior mode;

providing air from an exterior of said vehicle passenger compartment to said cleaning device during said exterior mode; and providing said interior air to said cleaning device during said interior mode.

* * * * *